Aug. 7, 1945.      C. E. BAHN      2,381,098
LENS SPACING FIXTURE
Filed Feb. 26, 1944

CARL E. BAHN
INVENTOR
BY
ATTORNEYS

Patented Aug. 7, 1945

2,381,098

UNITED STATES PATENT OFFICE 2,381,098

LENS SPACING FIXTURE

Carl E. Bahn, Rochester, N. Y., assignor to Bausch & Lomb Optical Company, Rochester, N. Y., a corporation of New York Application February 26, 1944, Serial No. 524,005

4 Claims. (Cl. 88—57)

This invention relates to a mounting fixture and particularly to a fixture for mounting a pluraltiy of photographic, microscopic, or similar lenses.

The now generally used practice of assembling complicated photographic objectives or the like comprises mounting the individual lenses in a suitable mount especially designed for the system with each lens thereof separated from adjacent lenses as prescribed by the lens designer. The completed objective is then optically tested to ascertain if the system produces the results sought by the designer.

As it is extremely difficult to hold all factors which influence image quality and other lens characteristics within the very narrow tolerances necessary in precision optical systems, it has been generally necessary to disassemble the system and change the position of the individual lenses which in the judgment of a skilled optical workman appeared to be necessary. The optical system was again assembled in the mount and the system again tested optically and often further modifications had to be made in the separation of the lenses before the system could be passed by an inspector.

An object of the present invention is to eliminate the cut and try methods now used so that a series of lenses making up an optical system can be mounted for trial and the lens separation determined before the lenses are finally assembled. This is done in the preferred embodiment of the invention through a fixture which comprises a plurality of telescopically mounted sleeves which are movable relative to each other. The individual lenses are mounted in the sleeves and the sleeves telescopically adjusted until the system is optically determined to produce the optimum performance.

The fixture includes means by which the amount of movement necessary to adjust the relative positions of the individual lenses can be accurately determined. Thus a workman thereafter assembling the individual lenses will space the lenses the distance apart which was found necessary to give the desired result. This eliminates the cut and try steps of the heretofore used methods and permits accurate mounting of lenses even though differences of refractive index and curvature exist as can be expected among a number of lenses manufactured nominally to the same specification.

Other features and advantages of the present invention will appear from the following description taken in connection with the accompanying drawing in which.

Figure 1:
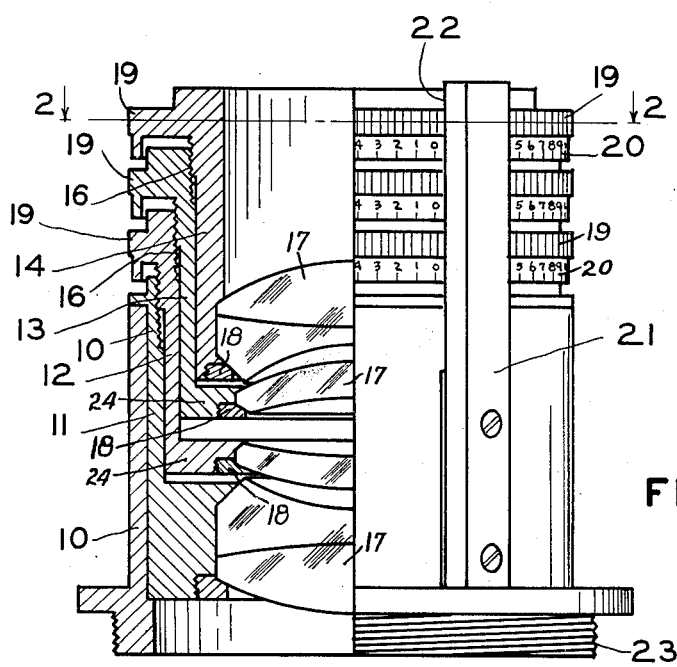
Fig. 1 is an elevational view partly in section of the fixture of the present invention.
Figure 2:
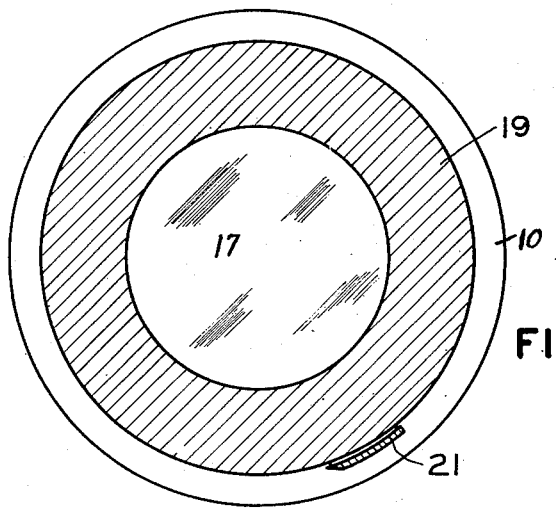
Fig. 2 is a section taken along line 2—2 of Fig. 1.

The fixture of the present invention in the now preferred embodiment thereof comprises, as is shown in Fig. 1, a mounting barrel 10 and a plurality of telescopically mounted sleeves 11, 12, 13, and 14. The outer surface of the sleeve 11 is made concentric with the bore or inner surface of the mounting barrel 10 so that when the sleeve is fixed within the barrel the axis thereof is coincident with the axis of the barrel.

The sleeves are of such a size that the outer diameter of each sleeve is just slightly less than the inner diameter of the sleeve in which it nests. The engaged surfaces of the sleeves are accurately ground concentric and each is formed with a threaded portion 16 and it will thus be seen that each sleeve is independently movable longitudinally of the axis of the barrel 10. It will be understood that as the engaged surfaces of the sleeves are concentric and slidably engage one another, they act as bearing surfaces and will hold the axes of the sleeves coincident in all positions of adjustment of the sleeves.

Each sleeve is provided with an inturned annular flange 24 in which is formed a lens receiving seat. The lenses 17, making up the system, are held on their respective seats by locking rings 18 threaded into the flanges 24 of the sleeves. As the lenses will have been completed at this assembly operation, the edge portions thereof may be used for locating the optical centers thereof on the common axis of the sleeves. This can be easily accomplished by accurately grinding the annular wall of each sleeve engaged by the edge portion of the lens mounted therein concentric and of a diameter slightly in excess of the diameter of the lens. Thus when the lenses are mounted to the respective sleeves and the locking rings threaded to place the optical axis of the system will be coincident with the longitudinal axis of the barrel 10.

Sleeves 12, 13, and 14 are formed with outwardly extending flanges 19 each provided with a depending skirt. A scale 20 is formed on the exterior surface of each skirt and the scale may be calibrated in any manner desired. To permit each scale to be easily read, a plate 21, having one end fixed to the mounting barrel 10, is provided with a knife edge 22 which forms an index line for all scales.

In the use of the fixture of the present invention the lenses making up the system are mounted as previously described and the fixture secured on an optical bench through the threaded extension 23 of the mounting barrel 10. The optician now rotates the sleeves by grasping the knurled surface of the flanges 19 to relatively adjust the position of the sleeves until the scales 20 show that the lenses are spaced apart the distance prescribed by the designer of the system. If it is found that the system when the lenses thereof are spaced apart according to the specifications, does not have the desired characteristics, the sleeves can be adjusted until the system produces the desired results. After the relative position of the lenses has been found which produces the optimum performance, the skilled worker is able to determine directly from the scales 20 the linear distance between the lenses and such distances are then noted for the assembler who then works to these dimensions and not to the dimensions of the designer of the system.

As the spacing between the lenses can be accurately determined before the lenses are secured in their permanent mount, the latter can be tailored to meet the requirements of each system and the lenses then permanently secured in the mount. Thus use of the fixture of the present invention obviates the troublesome method of assembling the system and then testing to ascertain if the lenses bring about the results desired. As it is extremely difficult to finish lens surfaces to the accuracy necessary to insure that all lenses nominally made to the same specifications will produce the results as computed by the designer, this method has been very inefficient for generally it was necessary to take the system apart and make some change in the position of the individual lenses making up the system.

It will be understood that in most instances it will be necessary to provide a fixture for each lens system due to variations in size, shape, and type of lens used in making up optical systems such as photographic objectives and the like. It is, therefore, to be understood that while certain embodiments of the present invention have been illustrated and described herein, the invention is not to be limited thereby for it is susceptible of changes in form and detail within the scope of the appended claims.

I claim:

1. In a device of the type described, a support, a plurality of telescopically mounted sleeves carried by the support; means for mounting a lens in each sleeve; means for independently moving said sleeves to adjust the air space between said lenses; a scale carried by each sleeve; and index means carried by the support and cooperative with said scales for ascertaining the distance between adjacent lenses.

2. In a device of the type described, a support, a plurality of telescopically mounted sleeves carried by the support; means for mounting a lens in each sleeve, said means cooperating with said lenses to hold said lenses with their optical axes coincident; means for independently moving each of said sleeves to adjust the air space between said lenses, said last named means comprising a threaded connection between adjacent sleeves; and cooperating scale and index means carried by the support and sleeves for ascertaining the distance between adjacent lenses.

3. In a device of the type described, a plurality of concentric sleeves telescopically mounted for sliding movement; means for slidably moving said sleeves; means for mounting a lens to each sleeve; a scale carried by each sleeve; means for mounting said sleeves on an optical bench; and means carried by said mounting means and forming an index line cooperative with said scales whereby the distance between adjacent lenses can be determined after said sleeves have been slidably moved to adjust the relative positions of said lenses.

4. A device of the type described comprising a support, a plurality of lens holding means carried by the support for holding a plurality of lenses in cooperative relation to form a lens system, said holding means being movably mounted on the support, means for moving said holding means for varying the distance between adjacent lenses, scale means carried by each of said holding means, and index means carried by the support for cooperation with the scale means whereby the distances between the lenses may be determined when the lenses are adjusted to produce the desired performance.

CARL E. BAHN.